250-203.CT AU 256 EX
-27-73 XR 3,775,558

United States Patent [19]

Moulton

[11] 3,775,558

[45] Nov. 27, 1973

[54] DIGITAL PHASE DISCRIMINATORS AND VIDEO GATE GENERATORS

[75] Inventor: Marc L. Moulton, Ridgecrest, Calif.

[73] Assignee: The United States of America as represented by the Secretary of the Navy, Washington, D.C.

[22] Filed: Dec. 13, 1971

[21] Appl. No.: 210,259

[52] U.S. Cl. .... 178/6.8, 178/DIG. 21, 250/203 CT, 328/109

[51] Int. Cl. .......... H04n 3/16, H03k 5/18

[58] Field of Search .......... 178/DIG. 21, 6.8; 343/7.4; 250/203 CT

[56] References Cited

UNITED STATES PATENTS

| | | | |
|---|---|---|---|
| 3,341,653 | 9/1967 | Kruse | 250/203 CT |
| 3,320,360 | 5/1967 | Thompson | 178/6.8 |
| 3,257,505 | 6/1966 | Van Wechel | 178/6.8 |
| 3,518,368 | 6/1970 | Olson | 178/6.8 |
| 3,448,271 | 6/1969 | Aldrich et al. | 178/6.8 |
| 3,507,991 | 4/1970 | Scotchie et al. | 178/6.8 |
| 3,039,002 | 6/1962 | Guerth | 250/203 |

*Primary Examiner*—Benjamin A. Borchelt
*Assistant Examiner*—H. A. Birmiel
*Attorney*—R. S. Sciascia et al.

[57] ABSTRACT

Digital pulse position discriminators and video gate and crosshair generators wherein the intervals during the gated period in which the first and last video pulses occur are compared, and the resultant error is used to reposition the gate about the video pulses such that they are centrally located therein.

8 Claims, 5 Drawing Figures

PATENTED NOV 27 1973 3,775,558

SHEET 3 OF 5

DIGITAL PHASE DISCRIMINATORS AND VIDEO GATE GENERATORS

BACKGROUND OF THE INVENTION

The need for improved reliability and performance of video tracking systems has resulted in the present invention. Previous video trackers have high drift, with the drift dependent on target size and shape, and tracking rates that are dependent on the target size. Additionally, numerous adjustments are required for optimum performance. And, finally, the performance of the trackers is reduced by the effect of random noise in the video signal.

The embodiments of the present invention are composed primarily of digital electronics resulting in trackers of very low drift regardless of target size or shape. The embodiments disclosed also provide full random noise immunity on a time average basis and tracking rates that are independent of target size. A further advantage of the digital format is the lack of adjustments necessary in the gate generator and phase discriminator.

SUMMARY OF THE INVENTION

The present invention is a digital phase discriminator and video gate and crosshair generator wherein the intervals during the gated period in which the first and last video pulses occur are compared, and the resultant error is used to reposition the gate with respect to the video pulses such that they are centrally located therein.

Four embodiments are disclosed, the first of which utilizes a clocked binary counter from which the gate and crosshair pulses are decoded, a binary register for storing the last video pulse occurring within the gate and recording its position therein, a second binary counter for recording the position of the first video pulse occurring within the gate by counting the number of intervals remaining in the gated period, and a summing circuit for comparing the positions of the first and last video pulse and providing an error signal feedback for centering the gate on the detected video. The second embodiment disclosed utilizes a clocked shift counter from which the gate and crosshair pulses are decoded, a discriminator coupled to the shift counter having circuitry for each interval during the gate such that the signals responsive to the first and last video pulses are provided by the circuitry associated with the respective intervals of occurrence, and a summing circuit for comparing the positions of the first and last video pulses and providing an error signal feedback for centering the gate on the detected video. The third embodiment disclosed is similar to the second embodiment but utilizes a tapped delay line instead of the shift counter. The fourth embodiment is similar to the second and third embodiments but utilizes a cascade of one-shot multivibrators instead of the shift counter or tapped delay line.

DESCRIPTION OF THE PREFERRED EMBODIMENT

Figure 1:
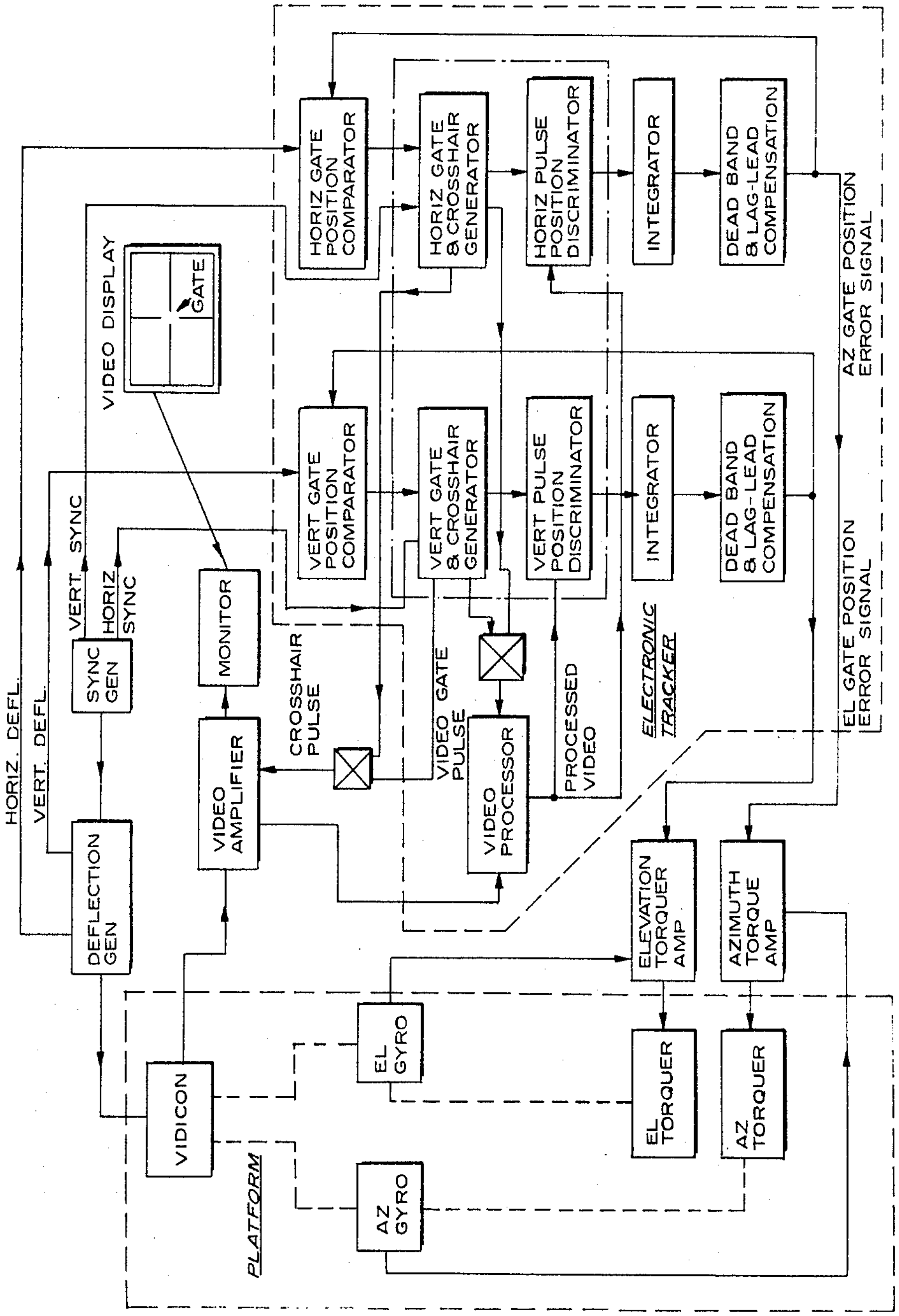
FIG. 1 is a block diagram of a complete tracking system showing how the present invention may be utilized therein.

FIG. 1 is a block diagram of a guidance system showing a breakdown of an electronic tracker and its interconnection with a TV camera and a rate-gyro stabilized platform.

Vertical and horizontal gate pulses are generated by, and combined in, the electronic tracker and the resulting composite gate pulses are used to enable a video sampling gate in the video processor. These gates are combined with crosshair pulses, also generated in the electronic tracker, and the resulting signal is added to the video in the video amplifier. This provides a visual indication on the monitor of the portion of the video being sampled.

Video information from the vidicon is amplified and processed to provide a narrow pulse for each change in relative contrast of the video. The processed video is then sampled in such a manner as to provide digital pulses corresponding to the maximum amplitude processed pulses occurring during the areas of the raster indicated by the video gate.

The processed video is compared with the horizontal and vertical gates by the pulse-position discriminators to derive error signals corresponding to the displacement of the video information in the video gate relative to the center of this gate.

These error signals are then integrated and used to position the video gate on the raster in such a way as to reduce the error signals to zero. The same integrated error signals are also fed to the torquer amplifiers, thereby moving the platform, and consequently the vidicon, at rates proportional to the error signals. Again, the direction of motion is that required to reduce the error signals to zero.

Signals for aerodynamically guiding the weapon may then be derived from these integrated discriminator error signals or from the rate-gyro outputs.

In summary, the electronic tracker generates the video gate and crosshairs and derives error signals corresponding to the relative position of the gate and the portion of the video within the gate.

Figure 2:
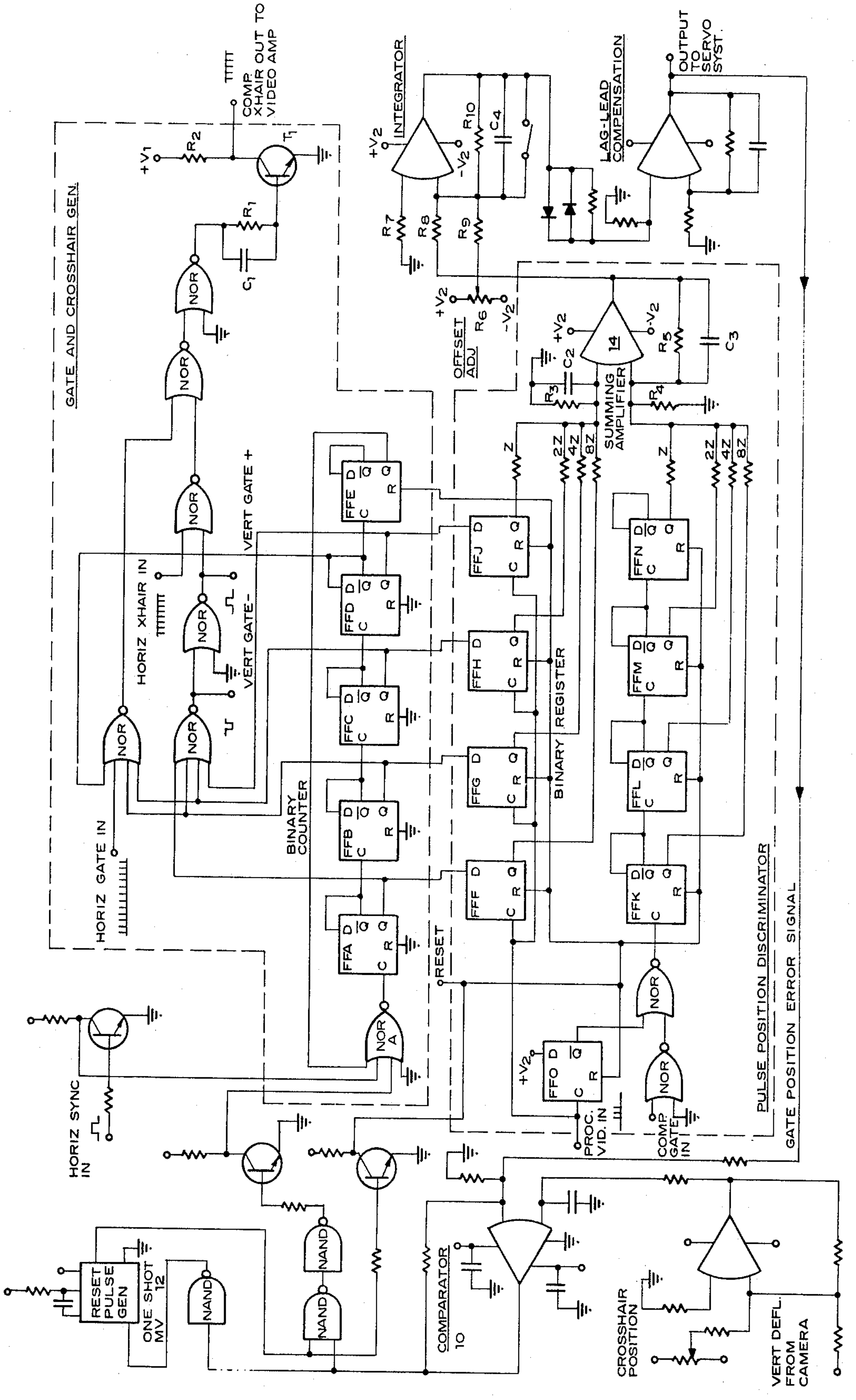
FIG. 2 is a schematic diagram of the first embodiment of the present invention.

FIG. 2 is a schematic diagram of the first embodiment of the present invention which derives a signal corresponding to the vertical or horizontal error, depending on its use. The description of its operation will be described in terms of its use in the vertical section of the tracker. The basis for this circuit is a group of binary pulse counters and registers FFA through FFN.

A variable-duty-cycle pulse from a comparator 10, may be used to trigger a one-shot multivibrator 12 to form a reset pulse for the pulse-position discriminators; this reset pulse is then added to the input pulse to extend it. The change of state of this combined waveform enables NOR gate A, which allows clock pulses, shown as horiz-sync in, to trigger the binary counter composed of flip-flops A through E at a particular rate, such as 15.75 kilohertz. On the 16th pulse, for the embodiment shown, the $\overline{Q}$ output of FFE changes to a high state, inhibiting NOR gate A and stopping the counter. The counter is rest by the next reset pulse and the action repeats. A 15-line vertical video gate pulse and a 2-line vertical crosshair pulse are decoded from this counter and combined with the horizontal video gate and crosshair pulses from the horizontal section to provide a composite crosshair waveform for the video display.

The pulse-position discriminator is composed of two digital sections and analog summing amplifier 14 (digital-to-analog converter). In the first section, a parallel register composed of flip-flops F, G. H, and J is connected to the binary counter in the gate generator and is parallel-clocked with the result that any clock pulse incident to this group of flip-flops will cause them to duplicate the state of the counter at that time. Since this register is clocked by the processed video, its state at the end of the vertical gate corresponds to the position of the last video pulse that occurred during the gate. The binary state of the register is converted to analog in a linear fashion by the summing amplifier to form one-half of the error signal.

The second section of the pulse-position discriminator is a binary counter composed of flip-flops K, L. M, and N, enabled by flip-flop O, and clocked by, for example, a 15-pulse composite gate waveform. FFO is triggered by the first video pulse occurring during the vertical gate and then latches, allowing the binary counter to be clocked by the remainder of the composite gate pulses. The state of this counter at the end of the vertical gate then corresponds to the position of the first video pulse in the gate and is converted, as before, to form the second half of the error signal.

The complete error signal at the output of summing amplifier 14 is then the difference of the two halves, resulting in a linear discriminator characteristic centered around zero and immune to noise on a time-average basis. No balance adjustments are required due to the inherent symmetry of the digital format.

This error signal is then integrated and compared with a synchronous sawtooth waveform (vertical deflection waveform) by the comparator to vary the gate position with respect to the raster.

The lag-lead compensation operates to increase the maximum tracking rate, but also includes sufficient limitation of acceleration to maintain stable tracking.

Filter capacitors on error signal summing amplifier 14 and the dead band in series with the integrator output, provide an acceleration limit to reduce output jitter. $R_{10}$, across the integrating capacitor, returns the gate to a centered position if tracking is lost. If the tracker is to be used primarily against moving targets, these items should be removed.

Figure 3:
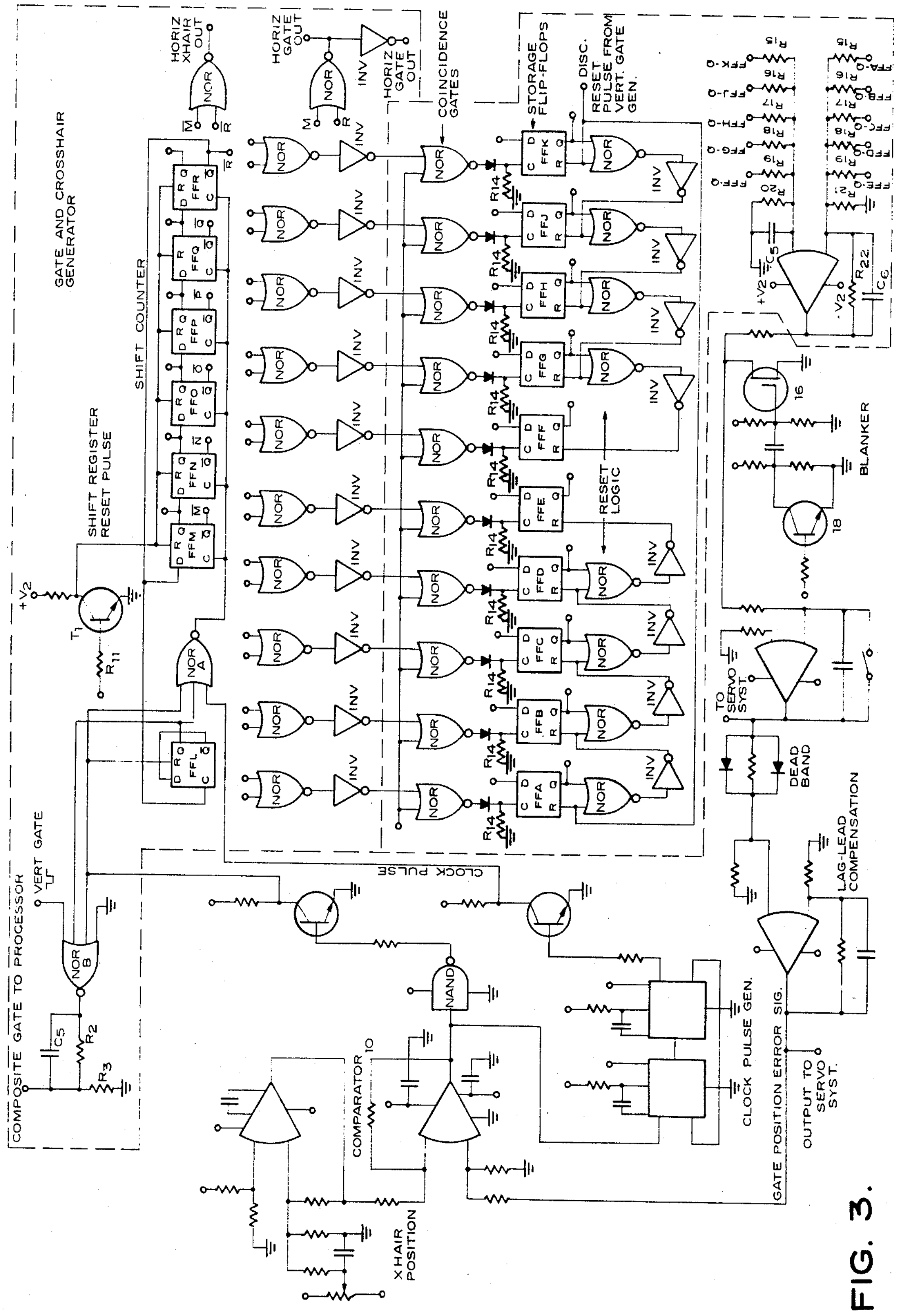
FIG. 3 is a schematic diagram of the second embodiment of the present invention.

The format for the second embodiment, shown in FIG. 3, is different than the format for the first embodiment and has advantages thereover where shorter time intervals are involved. The operation of the second embodiment will be described in terms of its use in the horizontal section of the tracker.

The operation is initiated in a similar fashion by comparator 10, but in this case a phased clock pulse, having a rate such as 3.7 megahertz, is gated to a 2N shift counter composed of flip-flops M through R, or as many as desired.

As shown, this counter has a capacity of 12 states and on the twelfth clock pulse the $\overline{Q}$ output of FFR changes from a low state to a high state, triggering FFL, which in turn inhibits NOR gate A and consequently the counter. A reset pulse, shown as vert-sync, is provided for the counter since it could otherwise count in a secondary mode.

A 2-interval (0.55 microsecond) crosshair pulse and an 11-internal (3 microsecond) horizontal gate pulse are decoded and used for the video display. Also, a second 3-microsecond horizontal gate pulse is derived from the input logic to the counter and combined with the vertical gate to provide a composite video gate pulse for the video processor. This pulse is decoded in such a way as to avoid the propagation delay associated with pulses decoded from the counter itself.

The horizontal gate is divided into sequential intervals by additional decoding of the counter and these sequential pulses are fed to video coincidence gates to sample the video in time sequence. The outputs of the coincidence gates are then pulse-stretched and used to set low- or medium-speed, latching flip-flops A through K. If high speed flip-flops are used, the pulse stretchers may be omitted.

Reset logic is included so that only one flip-flop of each group (A through E and F through K) remains set, otherwise, the discriminator response would vary with target size. The configuration is such that the discriminator output is determined by the pulses closest to the leading and trailing edges of the gate.

The digital state of these flip-flops is converted to analog by summing amplifier 14, and the resulting error signal is then integrated and compensated, as in the vertical section, and compared with the horizontal deflection sawtooth waveform to vary the gate position in the horizontal direction. FET 16 and transistor 18 following the summing amplifier blank the error signal during the gate interval to prevent the setup pulses of the pulse-position discriminator from causing an offset in the tracker.

The tracking rates and acceleration limits are the same as for the first embodiment.

Figure 4:
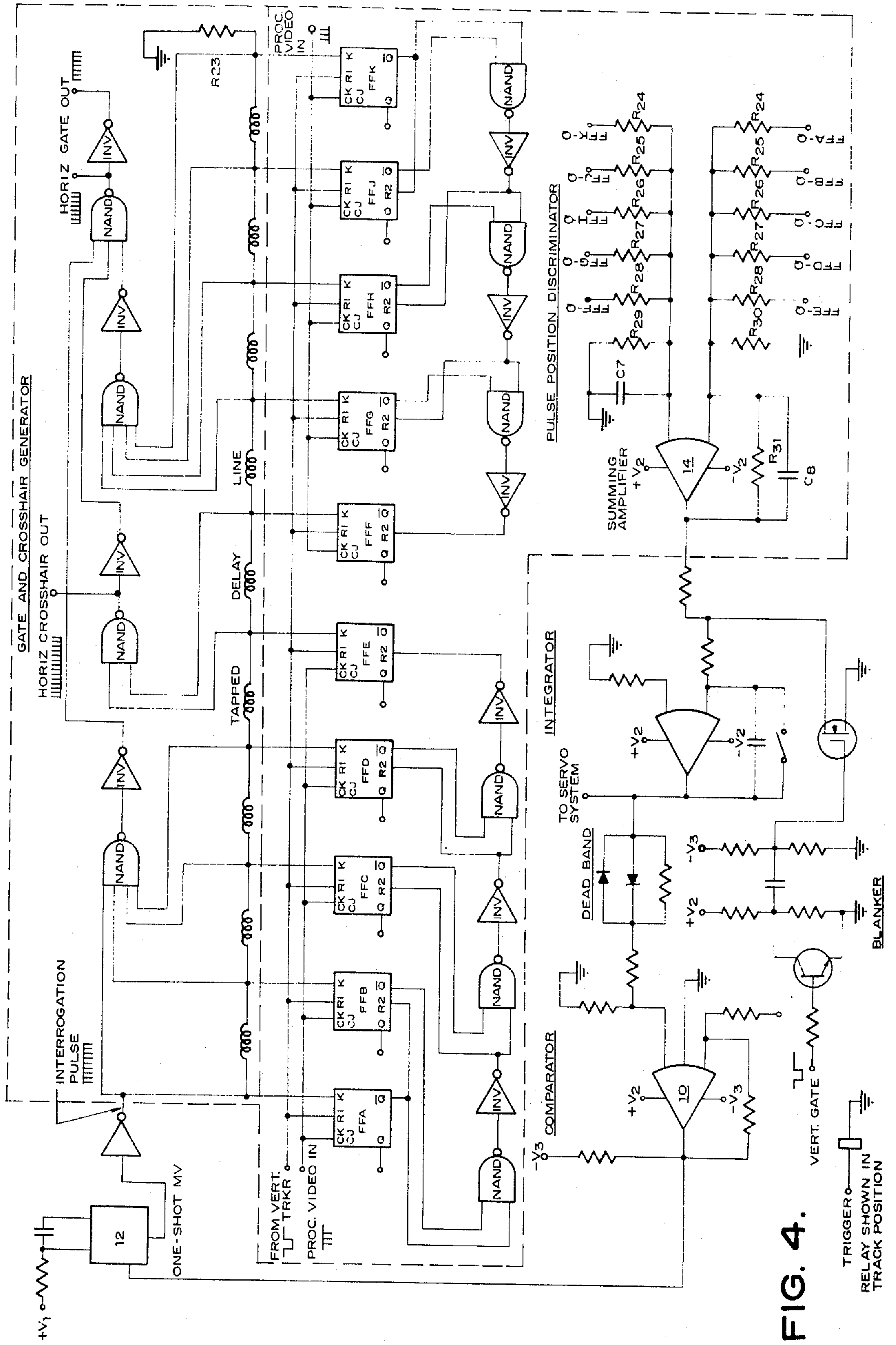
FIG. 4 is a schematic diagram of the third embodiment of the present invention.

The third embodiment of the present invention, shown in FIG. 4, is similar to the second embodiment above but uses tapped delay line 20 for dividing the gate into intervals and is, therefore, restricted to use as a horizontal tracker. For good results, the delay line should have a delay to rise time ratio of 20 to 1 or better.

A one-shot multivibrator, triggered by the output of comparator 10, generates an interrogation pulse which is then propagated along tapped delay line 20. The interrogation pulse width is approximately equal to 1.5 times the time interval between adjacent taps on the delay line. As the interrogation pulse is propagating along the delay line it sequentially enables flip-flops A through K to be clocked by the processed video. The video pulses applied to flip-flops F through K are 180° out of phase with those applied to flip-flops A through E to provide proper output balance for pulses occurring at the beginning and end of the gate.

Reset logic is applied to each group of flip-flops so that no more than one in each group will remain set, as, otherwise, the discriminator curve would vary with target size. The configuration is such that the discriminator output will be determined by the pulses closest to the end of the horizontal gate.

Also, the flip-flops are configured to latch so that they will not clock back if more than one video pulse is present during the time that they are enabled. The discriminator is reset by the reset pulse generated in the vertical tracker.

The digital state of the discriminator is converted to a symmetrical analog error signal by summing amplifier 14. The error signal is fed back through the integrator to comparator 10, the blanking circuit grounds the error signal during the vertical gate interval as in the second embodiment. If unbalance is present in the system, the unbalance may be minimized by using high speed flip-flops and a delay line having a greater delay to rise time ratio.

Figure 5:
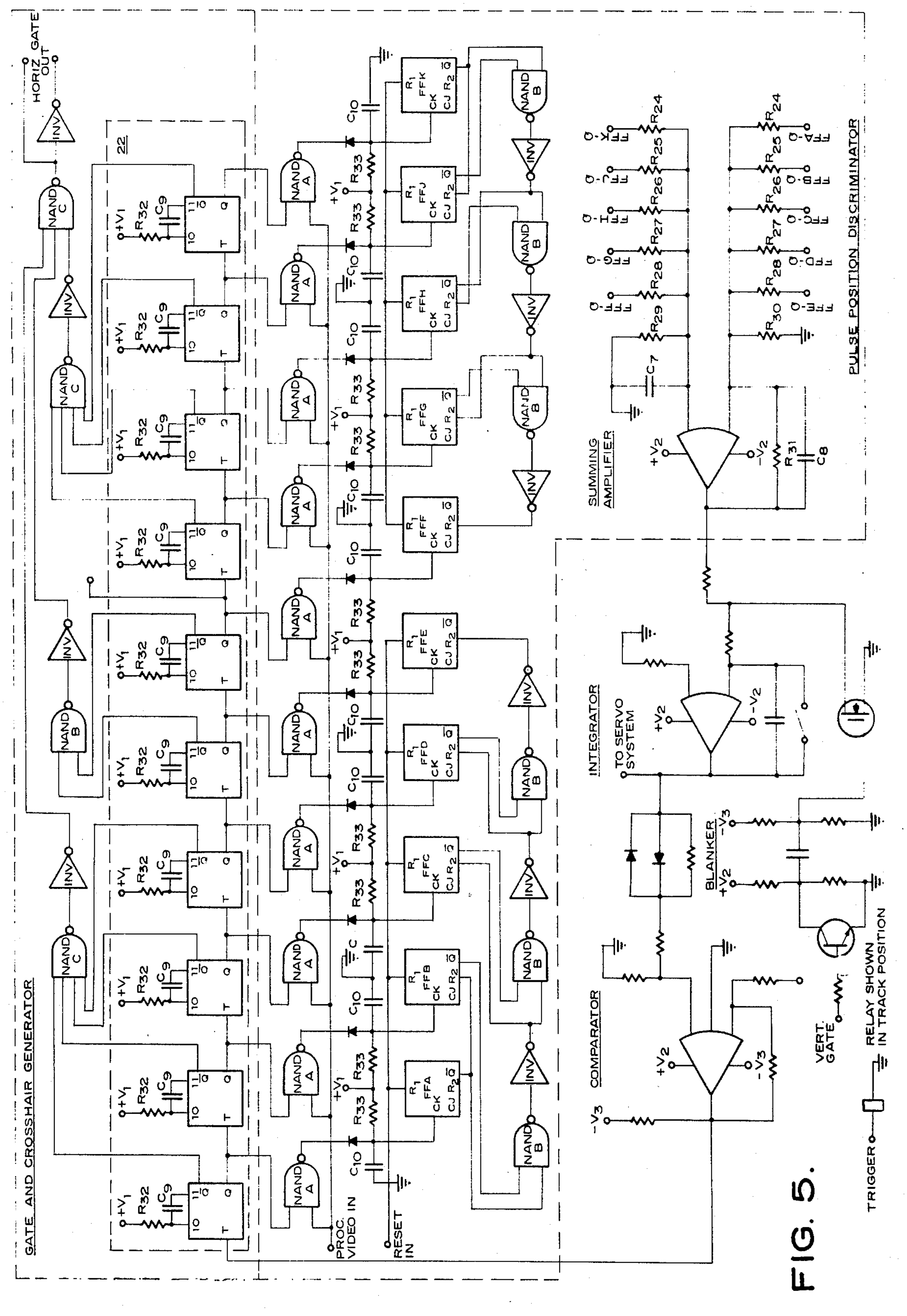
FIG. 5 is a schematic diagram of the fourth embodiment of the present invention.

The fourth embodiment, shown in FIG. 5, was designed to overcome problems inherent in the third embodiment while still allowing the use of low speed flip-flops. Tapped delay line 20 of the third embodiment is replaced by a cascade of one-shot multivibrators 22, the sequential outputs of which are compared, one at a time, with the processed video in medium speed NAND gates. The pulses from the NAND gates are then stretched and used to clock the corresponding flip-flops. If medium speed flip-flops are used the pulse stretchers may be omitted. The remainder of this embodiment is the same as the third embodiment.

The following list of component types and values, offered by way of example only, have been found useful in constructing operative devices of the above-disclosed embodiments:

| SYMBOL | COMPONENT | TYPE OR VALUE |
|---|---|---|
| $V_1$ | Supply voltage | 4 volts |
| $V_2$ | Supply voltage | 12 volts |
| $V_3$ | Supply voltage | 6 volts |
| $R_1$ | Resistor | 3.9 K |
| $R_2$ | Resistor | 1.5 K |
| $R_3$ | Resistor | 523 ohm |
| $R_4$ | Resistor | 560 ohm |
| $R_5$ | Resistor | 7.5 K |
| $R_6$ | Resistor | 50 K |
| $R_7$ | Resistor | 6.2 K |
| $R_8$ | Resistor | 10 K |
| $R_9$ | Resistor | 270 K |
| $R_{10}$ | Resistor | 15 K |
| $R_{11}$ | Resistor | 3.9 K |
| $R_{12}$ | Resistor | 20 K |
| $R_{13}$ | Resistor | 10 K |
| $R_{14}$ | Resistor | 100 K |
| $R_{15}$ | Resistor | 39 K |
| $R_{16}$ | Resistor | 51 K |
| $R_{17}$ | Resistor | 68 K |
| $R_{18}$ | Resistor | 100 K |
| $R_{19}$ | Resistor | 200 K |
| $R_{20}$ | Resistor | 931 ohm |
| $R_{21}$ | Resistor | 1 K |
| $R_{22}$ | Resistor | 13 K |
| $R_{23}$ | Resistor | 270 ohm |
| $R_{24}$ | Resistor | 20 K |
| $R_{25}$ | Resistor | 25 K |
| $R_{26}$ | Resistor | 33 K |
| $R_{27}$ | Resistor | 51 K |
| $R_{28}$ | Resistor | 100 K |
| $R_{29}$ | Resistor | 953 ohm |
| $R_{30}$ | Resistor | 1 K |
| $R_{31}$ | Resistor | 20 K |
| $C_1$ | Capacitor | 68 pf |
| $C_2$ | Capacitor | 1 $\mu$f |
| $C_3$ | Capacitor | 1 $\mu$f |
| $C_4$ | Capacitor | 12 $\mu$f NP |
| $C_5$ | Capacitor | 12 pf |
| $C_6$ | Capacitor | 0.5 $\mu$f |
| $C_7$ | Capacitor | 0.5 $\mu$f |
| $C_8$ | Capacitor | 0.33 $\mu$f |
| $C_9$ | Capacitor | 0.33 $\mu$f |
| $T_1$ | Transistor | 2N706 |
| 10 | Comparator | A710 |
| 12 | One-shot multivibrator | L951 |
| 14 | Summing amplifier | LH101 |
| 16 | Field effect transistor | 3N128 |
| 18 | Transistor | 2N706 |
| 20 | Tapped delay line | 3 $\mu$sec, $Z_0$ = 270 ohm |
| 22 | One-shot multivibrators | L951 each |
| D | Diode | hp 2800 |
| | Integrator | LH101 |
| | Comparator | A710 |
| Z | Resistor | 43.2 K |
| 2Z | Resistor | 90.9 K |
| 4Z | Resistor | 182 K |
| 8Z | Resistor | 365 K |

Although specific embodiments of the present invention have been discussed above numerous modifications and variations of those embodiments are possible, all of which should be considered as part of the present invention.

Of the systems described, the first and fourth embodiments are the most versatile in that they may be used as either horizontal or vertical trackers by simply changing the clock rates. A distinction can be made between the two, however, since even though the first embodiment has the fewest number of parts it requires the use of much higher speed logic if it is to be used as a horizontal tracker. It is recommended that the first embodiment be used as the vertical tracker and either embodiments 2, 3, or preferably 4, as the horizontal tracker.

I claim:

1. A discriminator for detecting the positions of video pulse signals within a gated period and providing an electrical signal for centering the gate on the positions, comprising:

means for detecting the position of the first said video pulse to occur within said gated period wherein said first pulse position detecting means includes a first binary counter coupled to the video pulse input;

means for detecting the position of the last said video pulse to occur within said gated period wherein said last pulse position detecting means includes a second binary counter coupled to a clock pulse, and a binary register coupled to said second binary counter and the video pulse input; and means for comparing said detected positions and modifying said gated period such that the positions are equally spaced about the center of said period wherein said comparing and modifying means includes a digital to analog converter coupled to said binary register and said first binary counter for comparing the outputs of the binary register and the first binary counter and providing an electrical signal in response to the comparison for modifying the gated period.

2. The discriminator of claim 1, further comprising:

means for generating a gate signal and a composite vertical and horizontal crosshair signal including said second binary counter wherein the gate signal and a remotely generated second gate signal and crosshair signal are combined to form the composite crosshair output for use in a guidance system.

3. The discriminator of claim 2 wherein said sequencing circuit includes a shift counter.

4. The discriminator of claim 2 wherein said sequencing circuit includes a tapped delay line.

5. The discriminator of claim 2 wherein said sequencing circuit includes a cascade of one-shot multivibrators.

6. The discriminator of claim 2, further comprising: means for generating a gate signal and a crosshair signal including said sequencing circuit.

7. A discriminator for detecting the positions of video pulse signals within a gated period and providing an electrical signal for centering the gate on the positions, comprising:

means for detecting the position of the first said video pulse to occur within said gated period;

means for detecting the position of the last said video pulse to occur within said gated period;

means for comparing said detected positions and modifying said gated period such that the positions are equally spaced about the center of said period; wherein said first and last pulse position detecting means include a sequencing circuit for providing enabling pulse outputs sequentially at a predetermined rate wherein each pulse output corresponds to an interval within the gated period and electronic circuitry coupled to the sequencing circuit for each interval within the gated period such that the circuitry associated with the interval of occurrence of the first and the last video pulse provides an electric signal output, and said comparing and modifying means includes a digital to analog converter coupled to the output of said circuitry associated with the interval of occurrence of the first video pulse and the output of said circuitry associated with the interval of occurrence of the last video pulse within the gate for comparing said interval circuitry outputs and providing an electrical signal in response to the comparison for modifying the gated period.

8. A method for detecting the positions of the first and the last video pulses within a gated period and generating an electrical signal to center the gate about the positions, comprising the steps of:

detecting the interval within the gated period in which the first video pulse occurs by digitally counting the intervals from the first edge of the gate to the occurrence of the first video pulse;

detecting the interval within the gated period in which the last video pulse occurs by digitally counting the intervals from the occurrence of the last video pulse to the second edge of the gate; and electronically comparing the detected intervals and generating an electric signal in response to the comparison for centering the gate such that the positions are equally spaced about the center of said period.

* * * * *